May 18, 1965  H. BOUTILLON  3,184,163
INDICATING AND CALCULATING APPARATUS
Filed June 13, 1963

May 18, 1965 H. BOUTILLON 3,184,163
INDICATING AND CALCULATING APPARATUS
Filed June 13, 1963 6 Sheets-Sheet 2

May 18, 1965  H. BOUTILLON  3,184,163
INDICATING AND CALCULATING APPARATUS
Filed June 13, 1963  6 Sheets-Sheet 3

May 18, 1965 H. BOUTILLON 3,184,163
INDICATING AND CALCULATING APPARATUS
Filed June 13, 1963 6 Sheets-Sheet 4

May 18, 1965  H. BOUTILLON  3,184,163
INDICATING AND CALCULATING APPARATUS
Filed June 13, 1963  6 Sheets-Sheet 6

United States Patent Office 3,184,163
Patented May 18, 1965

3,184,163
INDICATING AND CALCULATING APPARATUS
Henri Boutillon, Suresnes, France, assignor to Etablissements Boutillon S.A., Suresnes, France, a corporation of France
Filed June 13, 1963, Ser. No. 287,665
Claims priority, application France, July 13, 1962, 903,909
8 Claims. (Cl. 235—144)

Indicating and calculating apparatus are known which are associated with volumetric meters and liquid fuel distributors. These apparatus are composed of two main parts: a head and a variator.

The head is constituted by two rotary counters having numbered drums. One of them, which is directly driven by the volumetric meter, indicates the volume distributed and the other, driven through the medium of the variator, indicates the price to pay.

The variator is a gearbox which provides between the volume meter and the price counter a speed ratio which is equal or proportional to the price of the unit volume of the liquid distributed.

Apparatus of this type is described in French Patent No. 1,033,026 filed on February 22, 1951, by the applicant.

The object of the present invention is to provide an indicating and calculating apparatus of this type and more particularly a new and improved construction of the head which affords, among other things, an automatic zero setting.

To obtain this result this apparatus according to the invention is so arranged that:

(a) The transfer gears interconnecting each numbered drum to the numbered drum of the next higher order are each mounted on a lever which in a limited oscillation disengages the gear from the drum of lower order while leaving it partially engaged with the drum of higher order.

(b) There are provided composite levers composed of two articulated elements, there being one composite lever per drum; one of these elements carries a roller which co-operates with a heart-shaped cam connected to the drum so as to return the latter to zero, the other element, which is slightly shorter, comes in contact with the side of the cam so as to impart thereto an initial rotary impulse in the event that the roller engages the cam exactly on the point of the latter and is consequently rendered inoperative.

(c) There is provided a rotary grooved cam which rotates through the medium of a lever and a toothed sector, an eccentric shaft which acts on the levers carrying the transfer gears and causes the disengagement and then the re-engagement of the latter, the profile of the cam including two active parts causing the disengagement and then the re-engagement separated by an inactive part during the action of which the gears remain disengaged.

(d) The driving means for returning to zero is obtained from the extension of springs acting on a carriage movable in a rectilinear direction, the springs being compressed by a lever whose end acts on a finger which is pivoted to the carriage and is retracted, during the spring extension, out of the range of the lever.

Further features and advantages of the invention will be apparent from the ensuing description, with reference to the accompanying drawings to which the invention is in no way limited.

Figure 1:
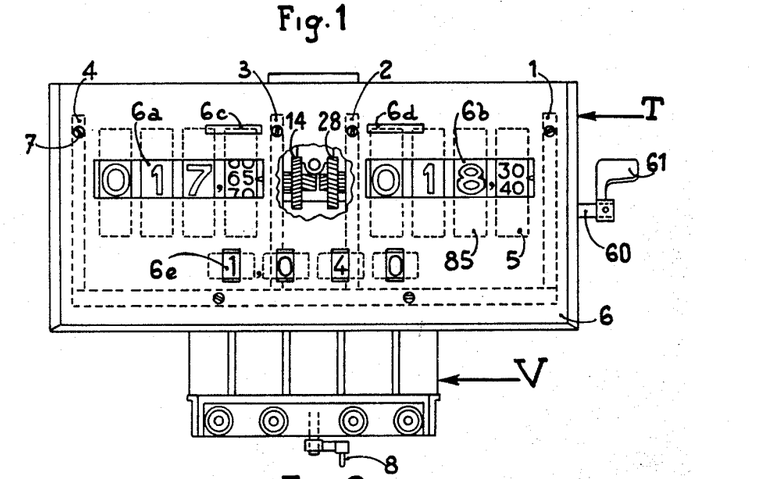
FIG. 1 is a front elevational view with parts cut away, of an apparatus according to the invention.
Figure 2:
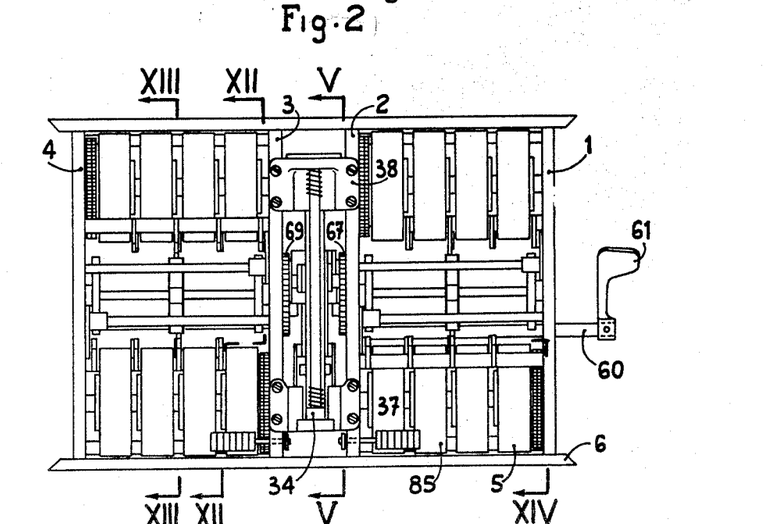
FIG. 2 is a plan view thereof.

As can be seen in FIGS. 1 and 2, the indicator head T is placed on the variator V which is identical to that described in the aforementioned French patent and therefore need not be described. The head comprises a chassis having four side members 1, 2, 3 and 4 which are assembled by bracing members (not shown) and form a cage in which are mounted the numbered drums such as 5 or 85 disposed in four groups each of which comprises four drums in the presently-described embodiment but which could comprise more or less than four drums without departing from the scope of the invention. Two groups are placed coaxially on one side of the indicator and the two other groups are placed on the opposite side.

Each side is closed by a dial, such as 6, provided with windows 6a and 6b through which are visible the numbers provided on the drums, this dial being fixed to the chassis by screws such as 7. On each of the two opposite sides the number indicating the distributed volume appears in the left window 6a and the number indicating the price to pay appears in the right window 6b.

Figure 3:
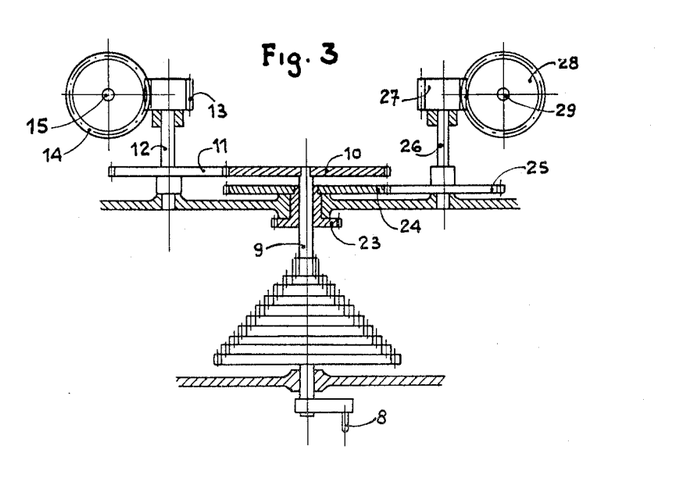
FIG. 3 is an elevational diagram of the numbered drum driving mechanism.
Figure 4:
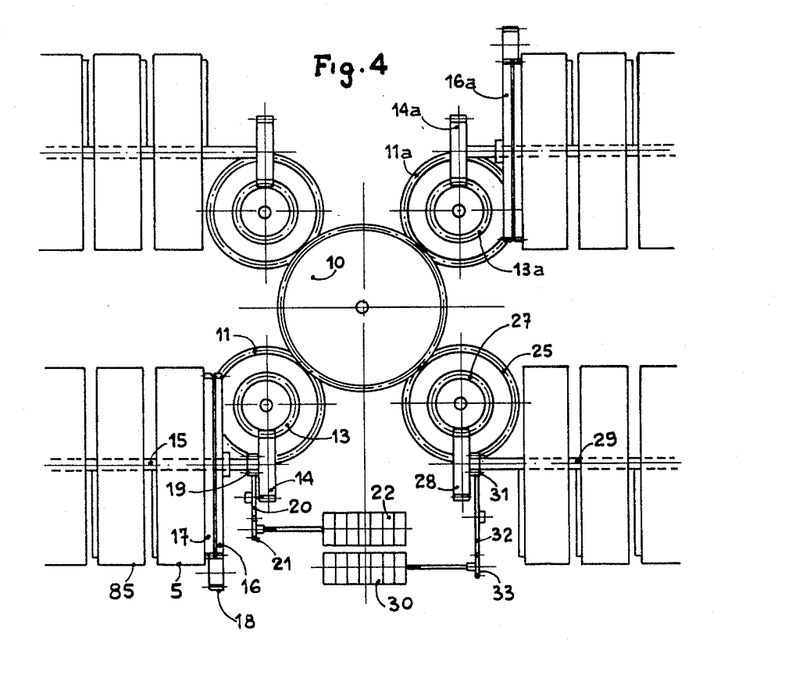
FIG. 4 is a plan diagram of said mechanism.

Two other windows 6c and 6d show the numbers of the totalizers and lastly four windows such as 6e show the numbers of the unit price carried by drums which have a vertical axis and form part of the variator. The drums are driven in rotation in the usual volumetric liquid measurer (not shown) by the handle 8 through the medium of a transmission mechanism diagrammatically shown in FIGS. 3 and 4. The central shaft 9 of the variator carries, keyed on its upper end a toothed wheel 10 meshed with a wheel 11 keyed on a vertical shaft 12 which carries at its upper part a helical gear 13 which is engaged with a helical gear 14 keyed on the end of a horizontal shaft 15 on which the volume indicating drums are freely rotative. A finely toothed wheel 16 (FIG. 4) is keyed on the shaft 15 and an identical wheel 17 adjacent the wheel 16 is connected to the drum 5. A gear 18 meshed with the wheels 16 and 17 insures their rotation in synchronism but as will be explained hereinafter, this gear can be disengaged so as to release the wheel 17 and the drum 5. A gear 19 rigid with the gear 14 meshes with an intermediate gear 20 meshed with a gear 21 which drives the volume totalizer counter 22 which is of conventional type and therefore need not be described.

On the other indicator face the volume indicating drums are driven in an identical manner by the same wheel 10 through toothed wheels 11a, 13a, 14a, and 16a.

The drums indicating the price to pay are driven in an identical manner by the output gear 23 of the differential gear train of the variator which freely rotates on the shaft 9 through the medium of a wheel 24 keyed on the gear 23 and meshed with a wheel 25 keyed on a vertical shaft 26 carrying at its upper part a helical gear 27 meshed with a helical gear 28 keyed on a shaft 29 which carries the drums indicating the price to pay.

The price totalizer 30 is driven by a gear 31 meshed with an intermediate wheel 32 which is itself meshed with a gear 33 keyed on a totalizer shaft.

Figure 5:
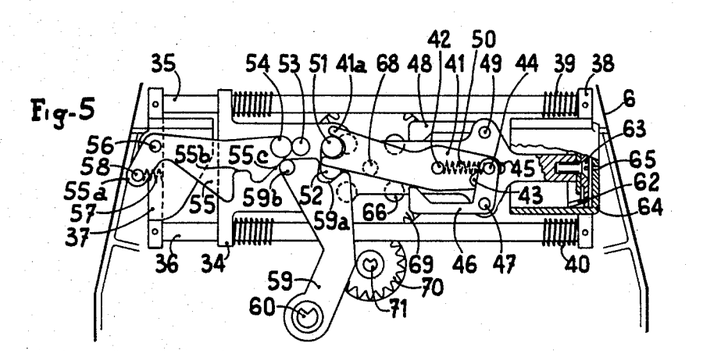
FIG. 5 is a sectional view taken along line V—V of FIG. 2 representing the zero-setting driving mechanism with its elements in the armed position.
Figure 6:
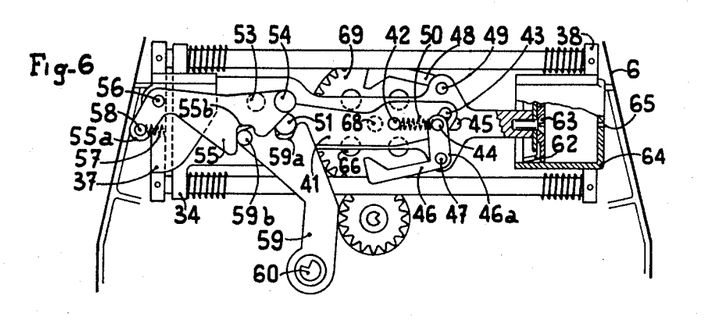
FIG. 6 is a view of the zero-setting mechanism with its elements in their unarmed position of rest.

The numbered drums are returned to zero by the following mechanism:

Located at the center of the head between the side members 2 and 3 (FIGS. 2, 5 and 6) is a carriage 34 which moves in a rectilinear direction in sliding along two rods 35 and 36 which are pinned to two bracing members 37, 38 interconnecting the side members 2 and 3 (FIGS. 5 and 6). Two strong springs 39 and 40 extending round the rods 35 and 36 and bearing against the bracing member 38 bias the carriage 34 to the left as viewed in FIGS. 5 and 6. Two identical levers 41 which are disposed on each side of the carriage 34 are pivotal about a common pin 42 fixed to the carriage 34. An oblique opening 43 is formed in the right end of each of the levers 41 and encompasses a pin 44 which is movable in a horizontal opening 45 formed in the carriage 34. One of the ends of the pin 44 is journalled in an arm 46a of a pawl 46 which is pivotally mounted at 47 on the front side of the carriage 34. The other end of the pin 44 is journalled in a symmetrical pawl 48 which is pivotally mounted at 49 on the rear side of the carriage. A spring 50 disposed within the carriage and bearing against the pin 42 biases the two pawls 46 and 48 and the levers 41 in directions to occupy the positions shown in FIG. 5. The left end of each of the levers 41 is in the form of a fork 41a and engages a common pin 51 which is movable in a vertical opening 52 formed in the carriage 34.

A pin 53 fixed in the carriage 34 is capable of bearing by its two ends against two rollers 54 fixed at the right end of two identical levers 55 which are pivotally mounted at 56 on the fixed member 37 one lever being provided on each side of the carriage 34, when the latter has been shifted toward the right as viewed in FIG. 5 in compressing the springs 39 and 40, as will be explained hereinafter. A spring 57 bearing against the member 37 exerts a pressure on a pin 58 which is fixed at its ends in the heels 55a of the two levers 55, thereby biasing said levers in the clockwise direction.

Two levers 59 disposed on both sides of the carriage 34 and keyed on a shaft 60—which is journalled in the members 1 and 2, parallel with the axes of the numbered drums, and extends outside the apparatus—serve to compress the springs 39 and 40 and then cause the extension thereof, as will be explained. Each of the two levers 59 comprises a notch 59a which extends round the pin 51 in the position of rest shown in FIG. 6. Each of them also carries a roller 59b which, in the same position of rest, is disposed in a notch 55b formed in the lever 55.

An outer crank 61 (FIGS. 1 and 2) keyed on the shaft 60 permits pivoting the pair of levers 59 in the clockwise direction from the position shown in FIG. 6. In this movement the notch 59a urges the pin 51 and the carriage 34 toward the right in compressing the spring 39 and 40 during which the high pressure exerted between the left side of the notch 59a and the pin 51 prevents the weak spring 50 from pivoting the levers 41 in the clockwise direction. During this movement, the roller 59b leaves the notch 55b in upwardly pivoting the lever 55 in opposition to the action of the spring 57 then, in rolling along a ramp 55c of the lever 55, allows the latter to return to its initial position. Further during this displacement the pawls 46 and 48 remain open (separated) as shown in FIG. 6. At the end of the displacement the elements occupy the position shown in FIG. 5, the roller 54 retains the pin 53 and consequently the carriage in the position shown in FIG. 5. When there is no longer outside action on the crank 61, the pressure between the notch 59a and the pin 51 disappears and the spring 50 pivots the lever 51 in the clockwise direction and closes the pawls 46 and 48. All the elements then occupy the positions shown in FIG. 5 and remain in these positions so long as no action is exerted on the outer crank 61.

When the crank is acted upon so as to pivot the shaft 60 and the lever 59 in the counterclockwise direction (as viewed in FIGS. 5 and 6), the roller 59b acting on the ramps 55c raise the lever 55 whose end roller 54 ceases to retain the pin 53 fixed on the carriage 34 and the latter then moves toward the left as viewed in the drawing under the effect of the thrust of the springs 39 and 40. The speed of this displacement is damped by an air damper piston 62 which is secured to the right end of the carriage 34 by a screw 63 and moves in a cylinder 64 rigid with the fixed bracing member 38. A calibrated orifice 65 formed in the end wall of the cylinder 65 determines the speed of displacement in the well-known manner; during this displacement the pin 51 remains raised, in contact with the upper end of the opening 52, in the position shown in FIG. 5. It is thus outside the range of the lever 59 which consequently cannot oppose the travel of the carriage 34.

During this travel, this pawl 48 placed on one side of the carriage encounters one of the four angularly equidistant pins, such as 66, fixed to a toothed wheel 69 which is rotative on a pin 68 fixed to the side member 3 (FIGS. 2, 5 and 6) and thus rotates it through a quarter of a revolution. Similarly, the pawl 46 placed on the other side of the carriage 34 imparts to a second wheel 67 identical to the wheel 69 and journalled in the side member 2 a quarter of a revolution. At the end of the travel of the carriage the pin 51 is placed under the roller 54 of the lever 55 and, when the lever 59 is swung by the outside crank 61 to the end of the counterclockwise oscillation the roller 59b moves into the notch 55b of the lever 55 whose end roller 54 bears under the effect of the spring 57 against the pin 51 and thus returns the elements to the position shown in FIG. 6.

It is the rotation of the wheels 67 and 69 through a quarter of a revolution which causes the numbered drums to return to zero through the medium of the following mechanism:

As this mechanism is identical for the four groups of numbered drums it is sufficient to describe only one of them.

The wheel 69 is meshed with a gear 70 keyed on a grooved shaft 71 (FIG. 7), the speed ratio being 2:1; the wheel 69 imparts to the gear 70 a rotation of half a revolution for each operation. The shaft 71 is journalled in the side members 3 and 4 and carries a grooved cam 72 in which is engaged a pin 73 fixed to one of the ends of a lever or arm 74 which is pivotally mounted at 75 on the chassis 4. The other end of the lever 74 is in the form of a toothed sector 76 which is meshed with a gear 77, the speed ratio being 4:1; this gear 77 is keyed on a shaft 78 which is journalled in the side members 3 and 4. This shaft has a larger diameter than the journals thereof and is eccentric relative to the latter. A fixed shaft 79 mounted in the side members 3 and 4 is parallel with the shaft 78 and a lever 80 which is freely pivotal thereon carries the aforementioned gear 18 for driving the drum 5 of the units of lower order. Another lever 81 (FIGS. 7 and 14), disposed adjacent the lever 80 but not rigidly connected thereto, terminates in a fork 82 which is engaged on the eccentric part of the shaft 78. The lever 80 carries an L-shaped projection 83 which extends into the fork 82 and a spring 84 is compressed between the lower branch of the fork 82 and the projection 83 and thus tends to maintain the two levers 80 and 81 in the relative position shown in FIG. 14.

Figures 13, 14, 15:
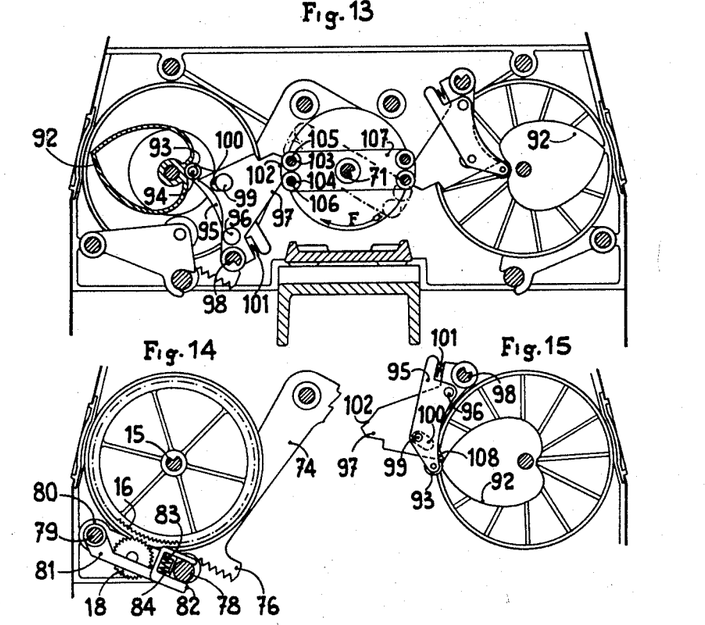
FIG. 13 is a sectional view taken along line XIII—XIII of FIG. 2.
FIG. 14 is a sectional view taken along line XIV—XIV of FIG. 2.
FIG. 15 is a detail view of a lever for returning the numbered drums to zero in the dead center position.

It has been seen hereinbefore that the shaft 71 and the cam 72 effect a rotation of one half a revolution for each operation. The cam is so arranged that:

(a) During the first eighth of a revolution the cam 72 acts on the lever 74 and on the gear 77 so as to rotate the eccentric shaft 78 through half a revolution and bring the levers 80 and 81 and the gear 18 in the disengaged position shown in FIG. 14, the drum 5 being thus disengaged.

Figure 7:
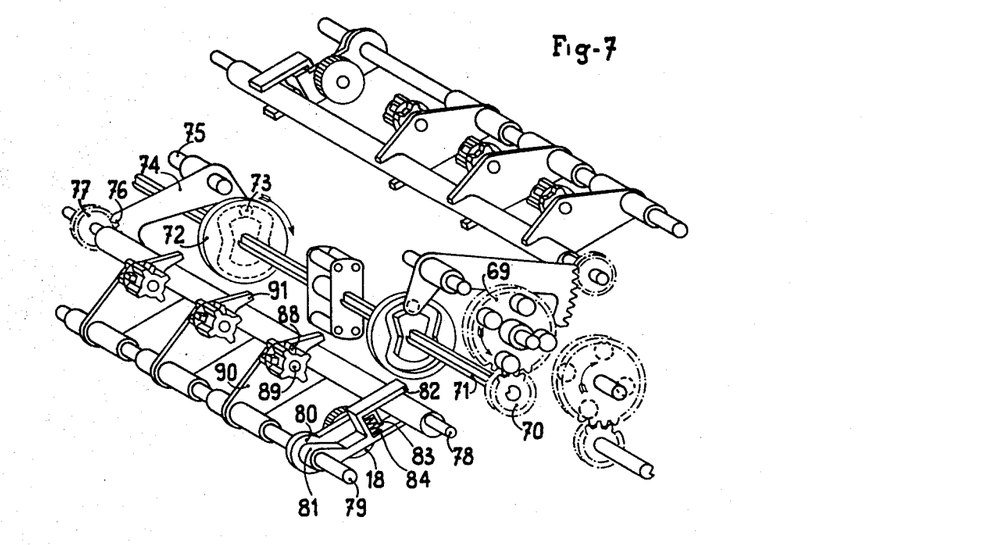
FIG. 7 is a developed diagram of the disengaging mechanism for the numbered drums.

(b) During the following quarter of a revolution of the cam 72 the roller or pin 73 of the lever 74 runs along a concentric part of the cam 72 as shown in FIG. 7, and during this quarter of a revolution the gear 18 remains in the disengaged position.

(c) During the final eighth of a revolution of the cam 72 the roller or pin 73 returns toward the center of the cam and the shaft 78 returns to its initial position in effecting half a revolution in the opposite direction, thus causing the re-engagement of the gear 18; should at this moment a tooth of the gear 18 abut a tooth of the wheel 16 the lever 80 stops moving and the lever 81 continues its travel alone in compressing the spring 84; when the wheel 16 next starts moving the expansion of the spring 84 will cause the full re-engagement of the gear 18 with the wheel 16.

As is well known, the drum 5 of the lower order rotates with a continuous motion during the counting whereas the drums of the upper orders rotate intermittently to the extent of one tenth of a revolution each time the drum of the immediately lower order has effected one revolution through the medium of the well-known disc and gear mechanism.

Figure 8:
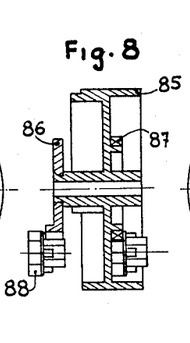
FIGS. 8, 9 and 10 are views of a numbered drum.
Figure 9:
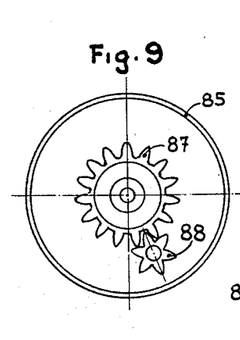
Figure 10:
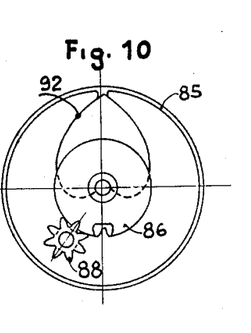

This mechanism is shown in FIGS. 8, 9 and 10 in which can be seen an intermittent drum 85 with its segmental gear 86 having two teeth and receiving gear wheel 87. The gear 88 comprises, as is known, two adjacent series of teeth. The series which is engaged with the gear 86 has eight teeth, four of which are axially long and four of which are axially short. The teeth which engage with the receiving wheel 87 of the following drum have six normal teeth and the wheel 87 has fifteen teeth. For each revolution the two teeth of the gear 86 impart to the gear 88 one quarter of a revolution and this gear rotates the drum of the immediately higher decimal order through $$\frac{1}{4} \times \frac{6}{15} = \frac{1}{10}$$

of a revolution. This mechanism is conventional and has merely been recalled, but according to the invention the gears such as 88, instead of rotating on a common shaft fixed in space as is usual practice are each mounted on a short individual shaft 89 (FIGS. 7 and 12) fixed to a lever 90 which is capable of pivoting about the shaft 79 and carries at its free end a fork 91 engaged on the eccentric shaft 78, so that they move away and then toward the center of the numbered drums at the same time and in the same manner as the gear 18 as has just been explained; but whereas the gear 18 in its disengaged position is completely disengaged from the wheel 16 the situation of the gear 88 is different. The part thereof having eight teeth is out of engagement with the two teeth of the gear 86 as can be seen on the right side of FIG. 12 but its toothing having six teeth and a diameter larger than that having eight teeth still remains in engagement with the wheel 87 of the drum 85, as can be seen on the left side of FIG. 12. Consequently, in the course of re-engagement of the gears, no undesired jamming can occur between the gear 88 and the wheel 87 or the gear 86.

Figure 11:
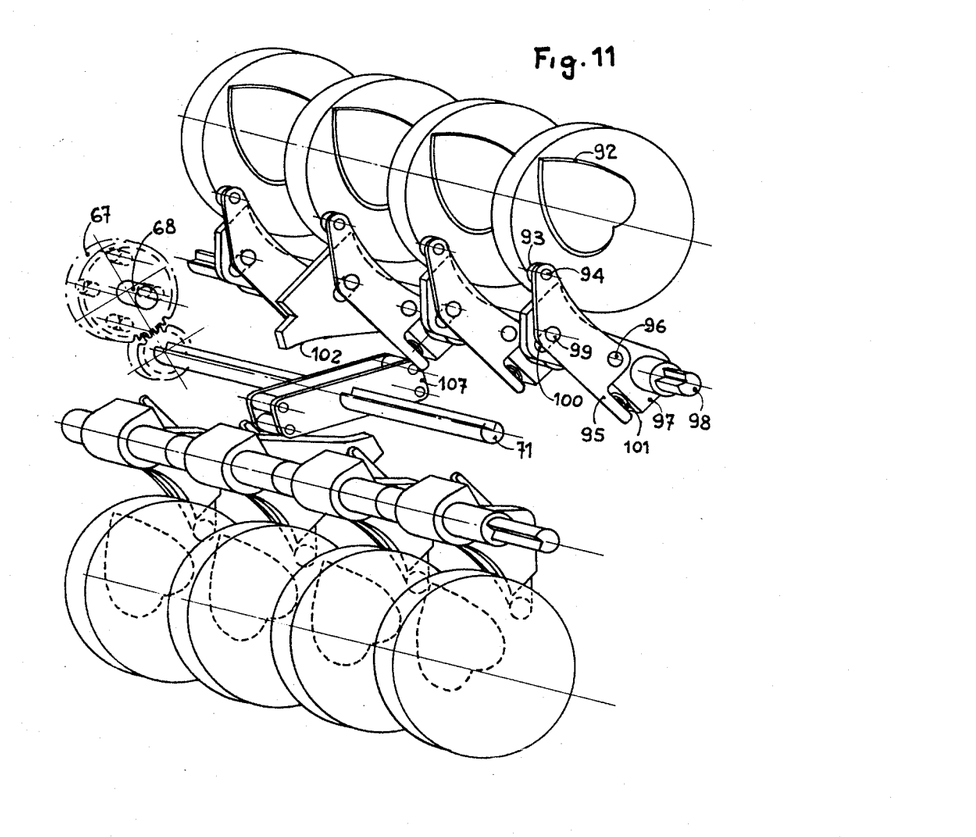
FIG. 11 is a developed diagram of the mechanism returning the numbered drums to zero.
Figure 12:
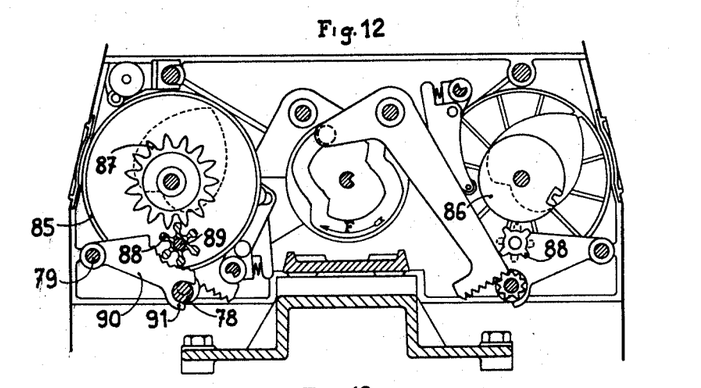
FIG. 12 is a sectional view taken along line XII—XII of FIG. 2.

Each of the numbered drums, such as 5 or 85, carries a heart-shaped cam 92 which is moulded in one piece with this drum (FIGS. 10, 11 and 13). In the plane of each of the heart-shaped cams is disposed a roller 93 which is journalled on a pin 94 fixed to the end of a lever 95 which is pivotally mounted at 96 on another lever 97. The latter is keyed on a shaft 98 which is parallel with the axis of the numbered drums and is journalled in the side members 3 and 4 or 1 and 2 of the chassis, depending on the group of drums under consideration. A pin 99 fixed to the lever 95 moves in an opening 100 formed in the lever 97 and thus limits the relative angular displacement of the two levers. A spring 101 interposed between the two levers biases the lever 95 to pivot in the counter clockwise direction when viewed in FIG. 13 or in the clockwise direction when viewed in FIG. 15. One of the levers 97 includes a heel 102 on which act two rollers 103 and 104 rotative on pins 105 and 106. The pins 105 and 106 are fixed to an arm 107 having two parallel side elements (FIG. 7) keyed on the shaft 71 which rotates through half a revolution in each operation, as explained hereinbefore.

At rest, the arm 107 occupies the position shown in full line in FIG. 11 and in dotted line in FIG. 13. During the first eighth of a revolution in the direction of arrow F, the arm 107 rotates in an empty space whereas the gears 18 and 88 are disengaged thus disengaging the numbered drums from their counting drive mechanism, as already explained. During the following quarter of a revolution, the arm 107 encounters the heel 102 through the medium of its rollers 103 and 104 and thus urges the rollers 93 against the heart-shaped cams which rotate and occupy at the end of this rotation through a quarter of a revolution of the shaft 71 the position shown in FIG. 13 in which the zeros of the numbered drums appear in the indicating windows. The shaft 71 then finishes its last eighth of a revolution during which the rollers are re-engaged as explained hereinbefore, and the arm 107 returns to the initial position shown in dotted line in FIG. 13.

During the counting, the rotating heart-shaped cams 92 urge back the levers 95 and 97 which do not offer any resistance.

Should it occur in the course of the operation just described that one of the rollers 93 exactly encountered the point of the heart-shaped cam 92 as shown in FIG. 15, there is a risk that the movement come to a standstill. In this event the lever 95 stops but the lever 97 continues its rotation in compressing the spring 101 until a nose portion 108 which is part of the lever 97 touches the inclined side of the cam 92 and causes it to rotate and thus eliminates the dead-center position.

Although specific embodiments of the invention have been described, many modifications and changes may be made therein without departing from the scope of the invention as defined in the appended claims.

Having now described my invention what I claim as new and desire to secure by Letters Patent is:

1. In an indicating and calculating apparatus comprising a lower order number drum and a higher order number drum; a transfer mechanism for rotating the higher order number drum a predetermined incremental amount in response to a predetermined rotation of the lower order drum, the transfer mechanism comprising a segmental gear secured to the lower order number drum, a full tooth gear secured to the higher order number drum, and a movable transfer pinion operatively interconnecting said gears; and resetting means for resetting both drums to a zero-indicating position comprising a first device operatively connected to the transfer pinion for shifting the transfer pinion between a first position in which the transfer pinion is in mesh with the full tooth gear and is capable of being engaged by the segmental gear during rotation of the lower order number drum and a second position in which the transfer pinion is partially in mesh with the full tooth gear and is incapable of being engaged by the segmental gear, a second device operatively connected to the drums for rotating the drums to a zero indicating position, and means operatively interconnecting the first device and second device so that the second device rotates the drums to the zero indicating position after the first device has shifted the transfer pinion to said second position.

2. In an indicating and calculating apparatus comprising a lower order number drum and a higher order number drum; a transfer mechanism for rotating the higher order number drum, a predetermined incremental amount in response to a predetermined rotation of the lower order drum, the transfer mechanism comprising a segmental gear secured to the lower order number drum, a full tooth gear secured to the higher order number drum, and a movable transfer pinion operatively interconnecting said gears; and resetting means for resetting both drums to a zero indicating position comprising a first device operatively connected to the transfer pinion for shifting the transfer pinion between a first position in which the transfer pinion is in mesh with the full tooth gear and is capable of being engaged by the segmental gear during rotation of the lower order number drum and a second position in which the transfer pinion is partially in mesh with the full tooth gear and is incapable of being engaged by the segmental gear, said first device comprising a pivotal lever on which the transfer pinion is rotatably mounted, the pivotal lever having a pivot axis which is parallel with the axis of rotation of said gears, a second device operatively connected to the drums for rotating the drums to a zero indicating position, and means operatively interconnecting the first device and second device so that the second device rotates the drums to the zero indicating position after the first device has shifted the transfer pinion to said second position.

3. In an indicating and calculating apparatus comprising a plurality of pairs of drums, one of the drums of each pair being a higher order number drum and the other drum of the pair being a lower order number drum; a transfer mechanism for each pair of drums for rotating the higher order number drum a predetermined incremental amount in response to a predetermined rotation of the lower order drum, the transfer mechanism comprising a segmental gear secured to the lower order number drum, a full tooth gear secured to the higher order number drum, a shaft, a lever pivotally mounted on the shaft, and a movable transfer pinion operatively interconnecting said gears and rotatably mounted on the lever; and resetting means for resetting all the drums to a zero-indicating position comprising a transfer pinion shifting device including a cam, a pivotal arm operatively connected to the cam to be pivoted by the latter, a toothed sector provided on one end of the arm, a rotatable shaft having an eccentric portion, the toothed sector being in mesh with a pinion integral with the shaft, actuating means operatively connected to the cam for rotating the arm, the eccentric portion co-operating with said lever of each transfer mechanism so that when the actuating means rotate the cam the transfer pinion is shifted between a first position in which the transfer pinion is in mesh with the full tooth gear and is capable of being engaged by the segmental gear during rotation of the lower order number drum and a second position in which the transfer pinion is partially in mesh with the full tooth gear and is incapable of being engaged by the segmental gear, a device operatively connected to the drums for rotating the drums to a zero indicating position, and means operatively interconnecting the transfer pinion shifting device and the drum rotating device so that the drum rotating device rotates the drums to the zero indicating position after the transfer pinion shifting device has shifted the transfer pinion to said second position.

4. The combination as claimed in claim 3, wherein the cam has two operative portions which respectively cause the transfer pinion to be shifted to said second position and thereafter to said first position as the cam rotates, and a dwell portion which is interposed between the operative portions and during the action of which the transfer pinion remains in said second position.

5. In an indicating and calculating apparatus comprising a plurality of pairs of drums, one of the drums of each pair being a higher order number drum and the other drum of the pair being a lower order number drum; a transfer mechanism for each pair of drums for rotating the higher order number drum a predetermined incremental amount in response to a predetermined rotation of the lower order drum, the transfer mechanism comprising a segmental gear secured to the lower order number drum, a full tooth gear secured to the higher order number drum, a shaft, a lever pivotably mounted on the shaft, and a movable transfer pinion operatively interconnecting said gears and rotatably mounted on the lever; and resetting means for resetting all the drums to a zero-indicating position comprising a transfer pinion shifting device including a rotatable first cam having two operative portions and a dwell portion interposed between the operative portions, a pivotal arm operatively connected to the cam to be pivoted by the latter, a toothed sector provided on one end of the arm, a rotatable shaft having an eccentric portion, the toothed sector being in mesh with a pinion integral with the shaft, actuating means operatively connected to the cam for rotating the cam, the eccentric portion co-operating with said lever of each transfer mechanism so that when the actuating means rotate the cam one of said operative portions of the cam shifts the pivotal arm in a direction to shift the transfer pinion from a first position, in which the transfer pinion is in mesh with the full tooth gear and is capable of being engaged by the segmental gear during the rotation of the lower order number drum, and a second position in which the transfer pinion is partially in mesh with the full tooth gear and is incapable of being engaged by the segmental gear, whereafter said dwell portion of the cam maintains the pivotal arm stationary in a position corresponding to said second position of the transfer pinion for a part of the rotation of the cam and finally the other operative portion of the cam shifts the pivotal arm in a direction to shift the transfer pinion from said second position to said first position thereof, a device operatively connected to the drums for rotating the drums to a zero-indicating position, and comprising a second arm connected to said cam to rotate with the latter, conventional heart-shaped second cams respectively connected to the drums for rotation with the drums, composite levers mounted to be pivotal about axes parallel with the axis of rotation of the drums and interposed between and operatively connected to the second arm and the heart-shaped second cams for rotating the drums to the zero-indicating position of the drums during the period in which the transfer pinion is in said second position, each composite lever including two elements capable of limited relative movement, one of the elements carrying a roller which engages the corresponding heart-shaped second cam, the other element being slightly shorter than the roller-carrying element so that the free end of the shorter element comes in contact with a part of the heart-shaped second cam other than the part the roller engages, whereby in the event the heart-shaped second cam assumes a position in which the roller would engage the point of the heart-shaped second cam the shorter element imparts to the heart-shaped second cam an initial impulse of rotation.

6. In an indicating and calculating apparatus comprising a plurality of pairs of drums, one of the drums of each pair being a higher order number drum and the other drum of the pair being a lower order number drum; a transfer mechanism for each pair of drums for rotating the higher order number drum a predetermined incremental amount in response to a predetermined rotation of the lower order drum, the transfer mechanism comprising a segmental gear secured to the lower order number drum, a full tooth gear secured to the higher order number drum, a shaft, a lever pivotably mounted on the shaft, and a movable transfer pinion operatively interconnecting said gears and rotatably mounted on the lever; and resetting means for resetting all the drums to a zero-indicating position comprising a transfer pinion shifting device including a rotatable first cam having two operative portions and a dwell portion interposed between the operative portions, a pivotal arm operatively connected to the cam to be pivoted by the latter, a toothed sector provided on one end of the arm, a rotatable shaft having an eccentric portion, the toothed sector being in mesh with a pinion integral wtih the shaft, actuating means operatively connected to the cam for rotating the cam, the eccentric portion co-operating with said lever of each transfer mechanism so that when the actuating means rotate the cam one of said operative portions of the cam shifts the pivotal arm in a direction to shift the transfer pinion from a first position, in which the transfer pinion is in mesh with the full tooth gear and is capable of being engaged by the segmental gear during the rotation of the lower order number drum, and a second position in which the transfer pinion is partially in mesh with the full tooth gear and is incapable of being engaged by the segmental gear, whereafter said dwell portion of the cam maintains the pivotal arm stationary in a position corresponding to said second position of the transfer pinion for a part of the rotation of the cam and finally the other operative portion of the cam shifts the pivotal arm in a direction to shift the transfer pinion from said second position to said first position thereof, a device operatively connected to the drums for rotating the drums to a zero-indicating position and comprising a second arm connected to said cam to rotate with the latter, conventional heart-shaped second cams respectively connected to the drums for rotation with the drums, composite levers mounted to be pivotal about axes parallel with the axis of rotation of the drums and interposed between and operatively connected to the second arm and the heart-shaped second cams for rotating the drums to the zero-indicating position of the drums during the period in which the transfer pinion is in said second position, each composite lever including two elements capable of limited relative movement, one of the elements carrying a roller which engages the corresponding heart-shaped second cam, the other element being slightly shorter than the roller-carrying element so that the free end of the shorter element comes in contact with a part of the heart-shaped second cam other than the part the roller engages, whereby in the event that the heart-shaped second cam assumes a position in which the roller would engage the point of the heart-shaped second cam the shorter element imparts to the heart-shaped second cam an initial impulse of rotation, and driving means for driving in rotation the first cam and the second arm, the driving means comprising a carriage mounted to be movable in a rectilinear path, resiliently yieldable means associated with the carriage so as to bias the carriage in one direction, a first lever pivotally mounted on the carriage, a second lever operatively connected to the first lever so as to shift the first lever and the carriage in opposition to the action of the resiliently yieldable means in a first direction of movement of the second lever, stop means associated with the second lever and the carriage and brought into action to stop movement of the carriage during movement of the second lever in said first direction of movement, movement of the second lever in a second direction opposite to said first direction shifting the first lever out of abutting relation to the carriage so as to release the carriage and allow the latter to be driven in said rectilinear path by the resiliently yieldable means, said carriage being operatively connected to said first cam and to said second arm so as to drive the first cam and second arm in rotation and reset the drum to zero.

7. The combination as claimed in claim 6 wherein said operative connection between the first cam and the carriage comprises a pawl carried by the carriage, a toothed wheel cooperating with the pawl and operatively connected to the first cam and said second arm so that rotation of the toothed wheel by the pawl when the carriage is urged along the resiliently yieldable means causes the first cam and the second arm to rotate sufficiently to reset the drums to a zero-indication.

8. In an indicating and calculating apparatus comprising a lower order number drum and a higher order number drum; a transfer mechanism for rotating the higher order number drum, a predetermined incremental amount in response to a predetermined rotation of the lower order drum, the transfer mechanism comprising a segmental gear secured to the lower order number drum, a full tooth gear secured to the higher order number drum, and a movable transfer pinion operatively interconnecting said gears, and resetting means for resetting both drums to a zero-indicating position comprising a first device operatively connected to the transfer pinion for shifting the transfer pinion between a first position in which the transfer pinion is in mesh with the full tooth gear and is capable of being engaged by the segmental gear during rotation of the lower order number drum and a second position in which the transfer pinion is partially in mesh with the full tooth gear and is incapable of being engaged by the segmental gear, a second device operatively connected to the drums for rotating the drums to a zero-indicating position, and means operatively interconnecting the first device and second device so that the second device rotates the drums to the zero-indicating position after the first device has shifted the transfer pinion to said second position, said second device comprising heart-shaped cams respectively connected to the drums to rotate with the drums, composite levers respectively engageable with the heart-shaped cams, each composite lever being pivotable toward the axis of rotation of the corresponding cam so as to rotate the cam to a position of the cam corresponding to a zero-indication of the corresponding drum, each composite lever comprising a first pivotal lever and a second lever pivotally mounted on the first lever, a freely rotative roller mounted on the free end of the second lever, a rigid nose portion provided on the free end of the first pivotal lever and offset to one side of the roller, and elastically yieldable means interposed between the first lever and second lever to bias the free end of the second lever toward the cam relative to the first lever, the composite lever being engageable with the cam through the roller and nose portion, whereby the nose portion encounters the side of the cam and imparts an initial impulse of rotation thereto in the event that the roller engages the heart-shaped cam exactly on the point thereof and is temporarily inoperative.

References Cited by the Examiner

UNITED STATES PATENTS

| 1,600,319 | 9/26 | Cox | 235—144 |
| 3,050,250 | 8/62 | Mann | 235—144 |
| 3,092,318 | 6/63 | Ham | 235—144 |

FOREIGN PATENTS 709,123  8/41  Germany.

OTHER REFERENCES

Kelch (German Auslegeschrift), 1,135,221, Aug. 23, 1962.

LEO SMILOW, *Primary Examiner.*